(12) United States Patent
Seo et al.

(10) Patent No.: US 10,791,476 B2
(45) Date of Patent: Sep. 29, 2020

(54) METHOD AND DEVICE FOR PERFORMING MEASUREMENT IN WIRELESS COMMUNICATION SYSTEM

(71) Applicant: LG ELECTRONICS INC., Seoul (KR)

(72) Inventors: Inkwon Seo, Seoul (KR); Hanbyul Seo, Seoul (KR); Seungmin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/103,673

(22) PCT Filed: Dec. 12, 2014

(86) PCT No.: PCT/KR2014/012268
§ 371 (c)(1),
(2) Date: Jun. 10, 2016

(87) PCT Pub. No.: WO2015/088276
PCT Pub. Date: Jun. 18, 2015

(65) Prior Publication Data
US 2016/0309355 A1 Oct. 20, 2016

Related U.S. Application Data

(60) Provisional application No. 61/914,975, filed on Dec. 12, 2013, provisional application No. 61/922,101, filed on Dec. 31, 2013.

(51) Int. Cl.
*H04W 28/02* (2009.01)
*H04W 40/24* (2009.01)
(Continued)

(52) U.S. Cl.
CPC ....... *H04W 28/0221* (2013.01); *H04W 8/005* (2013.01); *H04W 40/24* (2013.01);
(Continued)

(58) Field of Classification Search
None
See application file for complete search history.

(56) References Cited

U.S. PATENT DOCUMENTS 9,379,922 B2 * 6/2016 Lim .................... H04L 25/0328
2009/0316659 A1 12/2009 Lindoff et al.
(Continued)

OTHER PUBLICATIONS

ETRI, "Resource allocation for D2D discovery," 3GPP TSG RAN WG1 Meeting #74bis, R1-134336, Guangzhou, China, Oct. 7-11, 2013, pp. 1-4.
(Continued)

*Primary Examiner* — Christopher T Wyllie
(74) *Attorney, Agent, or Firm* — Birch, Stewart, Kolasch & Birch, LLP

(57) ABSTRACT

A method by which a terminal measures device-to-device (D2D) resources in a wireless communication system, according to one embodiment of the present invention comprises the steps of: receiving allocated resources for D2D transmission and reception; performing a first measurement on resource regions for the D2D transmission and reception; determining resource regions in which a discovery signal exists, which are estimated on the basis of the first measurement result; and performing a second measurement on the estimated resource regions.

14 Claims, 7 Drawing Sheets

(51) Int. Cl.
*H04W 8/00* (2009.01)
*H04W 72/04* (2009.01)
*H04W 72/08* (2009.01)
*H04W 76/14* (2018.01)
*H04W 24/10* (2009.01)
*H04L 5/00* (2006.01)

(52) U.S. Cl.
CPC ....... *H04W 72/048* (2013.01); *H04W 72/085* (2013.01); *H04L 5/0094* (2013.01); *H04W 24/10* (2013.01); *H04W 28/0236* (2013.01); *H04W 76/14* (2018.02)

(56) References Cited

U.S. PATENT DOCUMENTS

| | | | |
|---|---|---|---|
| 2010/0303051 A1 | 12/2010 | Umeuchi et al. | |
| 2010/0309797 A1* | 12/2010 | Lindoff | H04B 17/318 370/252 |
| 2011/0274083 A1 | 11/2011 | Bazzo et al. | |
| 2012/0082038 A1 | 4/2012 | Xu et al. | |
| 2012/0082070 A1 | 4/2012 | Hart et al. | |
| 2012/0307922 A1 | 12/2012 | Simonsson et al. | |
| 2013/0010618 A1* | 1/2013 | Wang | H04W 8/005 370/252 |
| 2013/0109301 A1 | 5/2013 | Hakola et al. | |
| 2013/0138831 A1* | 5/2013 | Patil | H04W 28/0289 709/235 |
| 2013/0273923 A1 | 10/2013 | Li et al. | |
| 2013/0322276 A1 | 12/2013 | Pelletier et al. | |
| 2015/0043438 A1* | 2/2015 | Fwu | H04B 7/0417 370/329 |
| 2015/0045050 A1* | 2/2015 | Sartori | H04W 24/10 455/452.1 |
| 2015/0049649 A1* | 2/2015 | Zhu | H04W 72/0473 370/277 |
| 2015/0071189 A1* | 3/2015 | Park | H04W 8/005 370/329 |
| 2015/0092706 A1 | 4/2015 | Chen et al. | |
| 2015/0098416 A1* | 4/2015 | Kuo | H04W 72/04 370/329 |
| 2015/0099511 A1* | 4/2015 | Lindoff | H04W 56/001 455/426.1 |
| 2015/0327047 A1* | 11/2015 | Tiirola | H04W 8/005 370/338 |
| 2016/0142898 A1* | 5/2016 | Poitau | H04W 72/0446 370/329 |
| 2016/0234702 A1* | 8/2016 | Heo | H04W 36/32 |
| 2016/0309355 A1* | 10/2016 | Seo | H04W 72/048 |
| 2017/0163470 A1* | 6/2017 | Seo | H04W 40/246 |
| 2018/0027401 A1* | 1/2018 | Niu | H04L 47/11 370/329 |

OTHER PUBLICATIONS

Samsung, "Resource Configuration & Selection for D2D Direct Discovery," 3GPP TSG RAN WG2 Meeting #83, R2-132526, Barcelona, Spain, Aug. 19-23, 2013, pp. 1-4.

ZTE, "Discussion of D2D Discovery," 3GPP TSG-RAN WG1 #74, R1-133149, Barcelona, Spain, Aug. 19-23, 2013, pp. 1-10.

* cited by examiner

FIG. 5
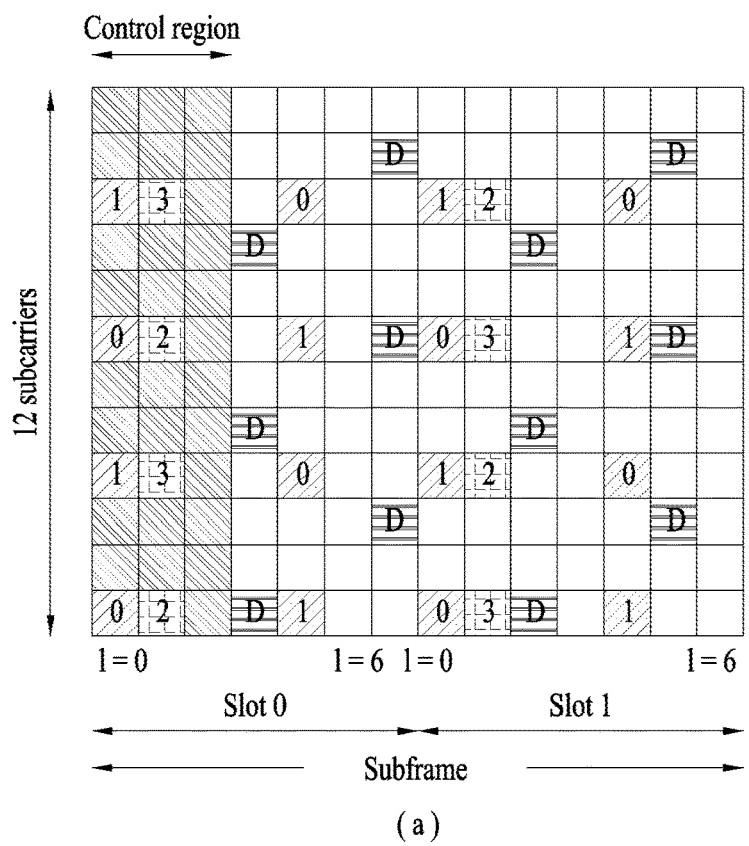
(a)
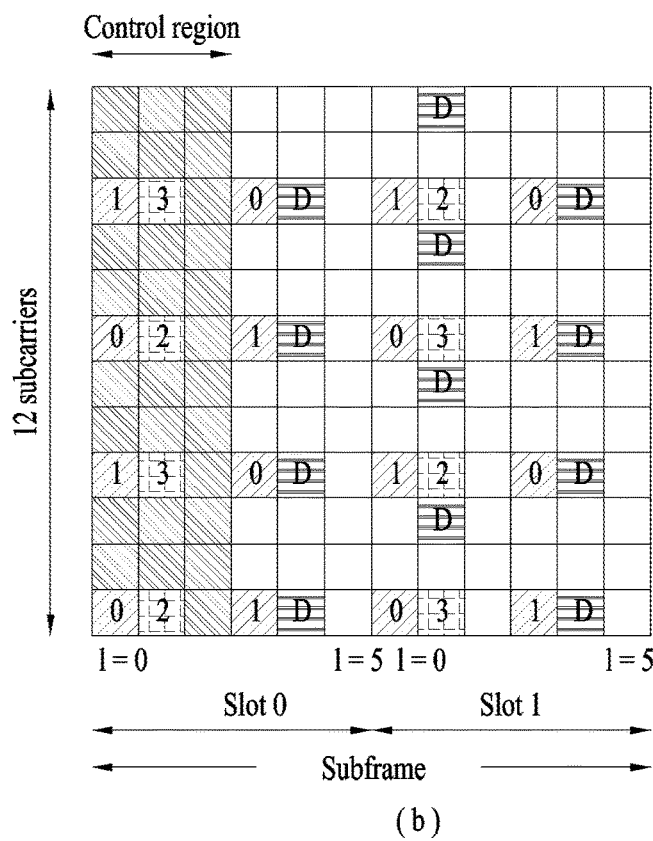
(b)

METHOD AND DEVICE FOR PERFORMING MEASUREMENT IN WIRELESS COMMUNICATION SYSTEM

CROSS REFERENCE TO RELATED APPLICATIONS

This application is the National Phase of PCT International Application No. PCT/KR2014/012268, filed on Dec. 12, 2014, which claims priority under 35 U.S.C. 119(e) to U.S. Provisional Application Nos. 61/914,975, filed on Dec. 12, 2013, and 61/922,101, filed on Dec. 31, 2013, all of which are hereby expressly incorporated by reference into the present application.

TECHNICAL FIELD

The present invention relates to a wireless communication system, and more particularly, to a method and apparatus for device-to-device communication and apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE OF THE INVENTION

Technical Task

The technical task of the present invention is to provide a method for D2D device to perform measurement.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of performing measurement in performing D2D (device-to-device) resource measurement by a user equipment in a wireless communication system, including the steps of receiving allocation of a resource for D2D transceiving, performing a first measurement on a resource region for the D2D transceiving, determining a resource region estimated as having a discovery signal exist therein based on a result of the first measurement, and performing a second measurement on the estimated resource region.

In another technical aspect of the present invention, provided herein is a user equipment device in performing D2D (device-to-device) resource measurement by a user equipment in a wireless communication system, including a receiving module and a processor configured to receive allocation of a resource for D2D transceiving, perform a first measurement on a resource region for the D2D transceiving, determine a resource region estimated as having a discovery signal exist therein based on a result of the first measurement, and perform a second measurement on the estimated resource region.

The following matters may be included in the aspects of the present invention.

The first measurement may be performed in a manner of detecting energy from the resource region for the D2D transceiving.

If the resource region estimated as having the discovery signal exist therein is equal to or greater than a preset value, the user equipment may increase discovery signal transmission periodicity.

If a ratio of the resource region exceeding a threshold in case of following a result of the second measurement is equal to or greater than a preset value, the user equipment may receive additional allocation of resource for the D2D transceiving from a base station for the resource for the D2D transceiving.

If a ratio of the resource region exceeding a threshold in case of following a result of the second measurement is equal to or greater than a preset value, the user equipment may report the result of the second measurement to a base station for the resource for the D2D transceiving.

The second measurement may be to calculate at least one of RSSI (received signal strength indicator) and RSRQ (reference signal received quality) of the resource region estimated as having the discovery signal exist therein.

The RSSI may be a value resulting from converting a total received signal strength into a signal strength per unit resource in the resource allocated for the D2D transceiving.

The user equipment may report a ratio of the resource having the RSSI exceed a preset threshold to a base station for the resource for the D2D transceiving.

The RSRQ may be a ratio of RSRP per unit resource for RSSI of the resource allocated for the D2D transceiving.

The user equipment may report a ratio of the resource having the RSRQ exceed a preset threshold to a base station for the resource for the D2D transceiving.

The second measurement may include the measurement of BLER (block error rate) for the resource region estimated as having the discovery signal exist therein.

The first measurement may be performed by detecting a sequence for the discovery signal.

The first measurement may be performed by detecting CRC (cyclic redundancy check) for the discovery signal.

Advantageous Effects

According to the present invention, resources for D2D transmission/reception can be efficiently used through measurement.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram to describe a reference signal.

BEST MODE FOR INVENTION

Figure 1:
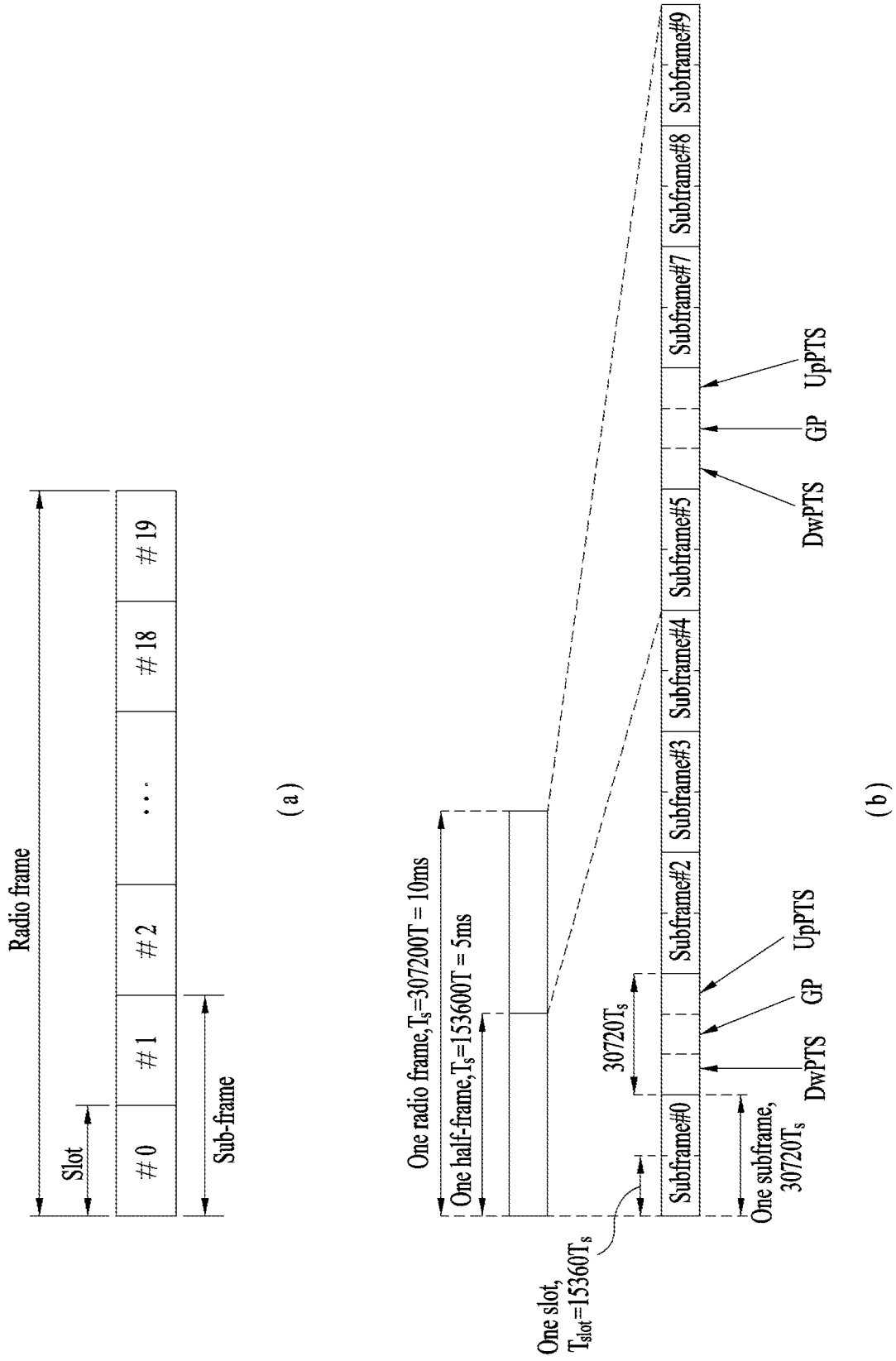
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
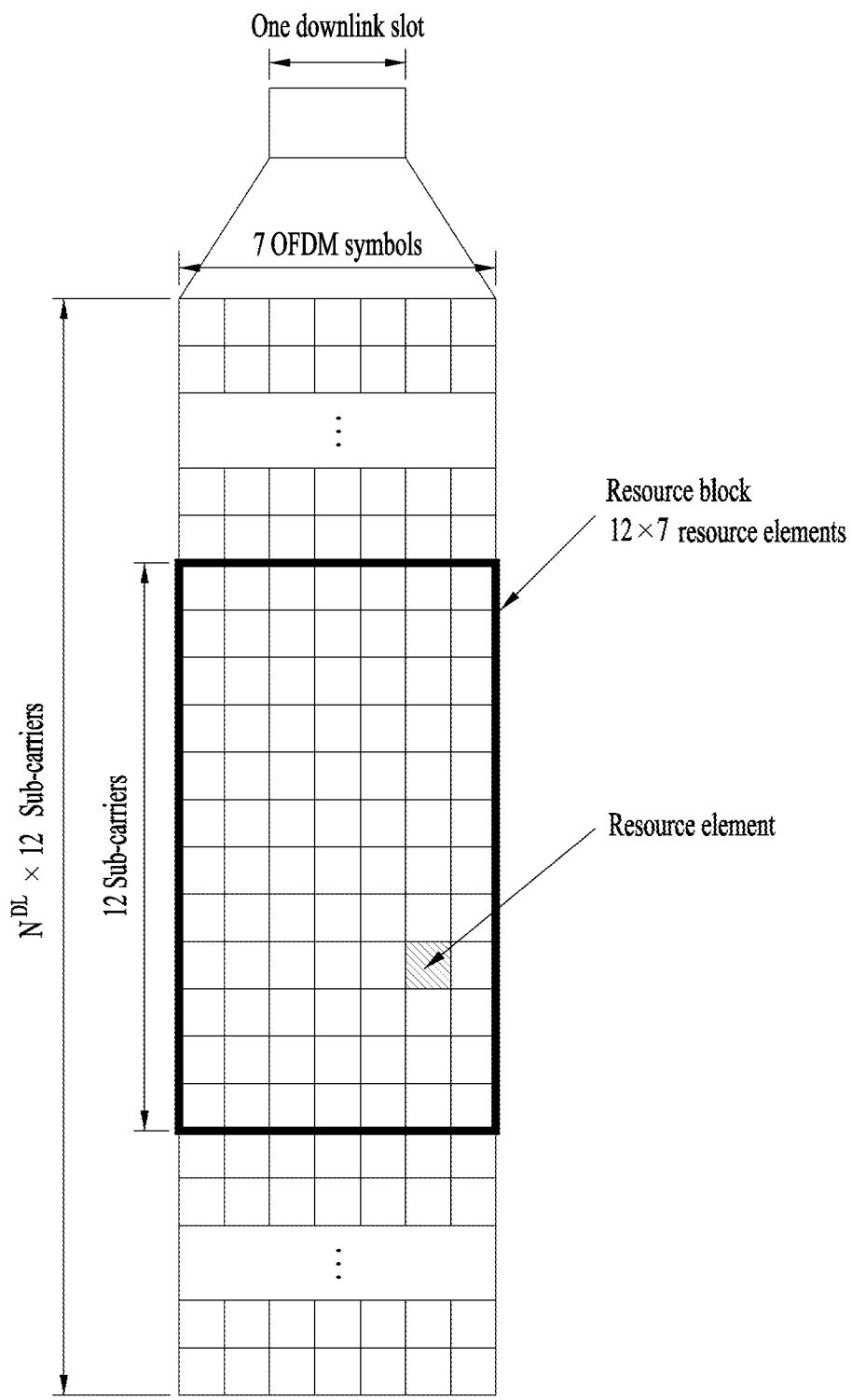
FIG. 2 is a diagram of a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
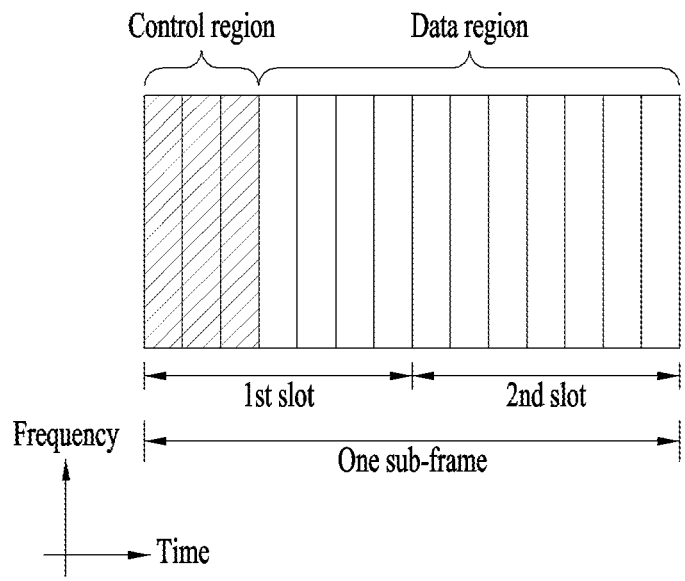
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
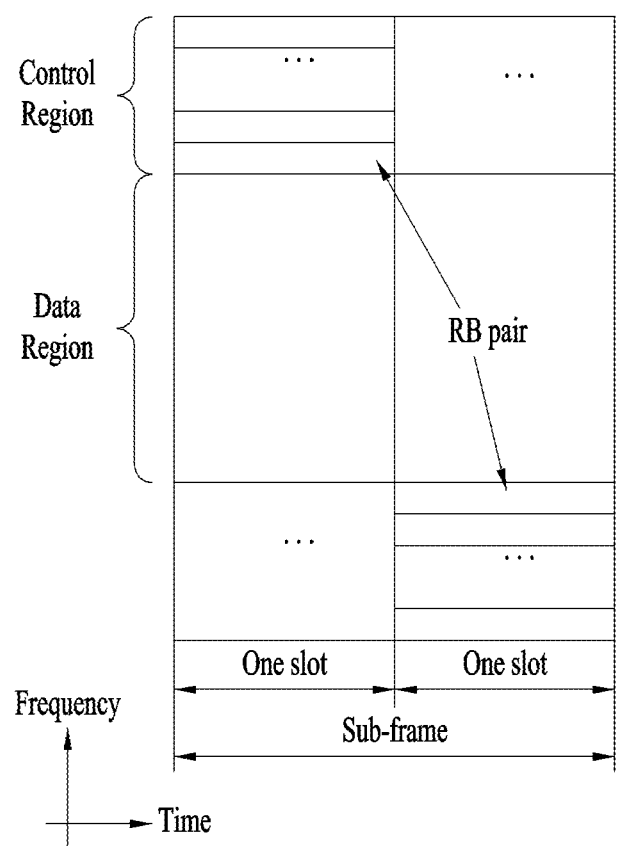
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For instance, if the number of transmitting antennas of an eNB is 2, CRS for antenna ports #0 and #1 is transmitted. If the number is 4, CRS for antenna ports #0 to #3 are transmitted respectively.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see. FIG. 5(a)) and 12 OFDM symbols in time in the case of the extended CP (see FIG. 5(b)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Measurement/Measurement Report

Measurement report is provided for one of various methods (e.g., handover, random access, cell search, etc.) for mobility of a user equipment (hereinafter abbreviated UE) or the various methods. Since measurement report needs demodulation of a prescribed level, it can be performed after a user equipment has obtained synchronization and physical layer parameters except received signal strength measurement. Concept of measurement report includes RRM measurement for measuring signal strength of serving and neighbor cells, total reception power to signal strength and the like (e.g., reference signal receive power (RSRP), received signal strength indicator (RSSI), reference signal received quality (RSRQ), etc.) and RLM measurement for evaluating a presence or non-presence of radio link failure by measuring a quality of link to a serving cell.

Regarding RRM, RSRP is a linear average of power distribution of RE for carrying CRS in downlink (DL). RSSI is a measurement value including interference and noise power from adjacent cells and the like by targeting OFDM symbol including RS for antenna port 0 as a linear average of total receive power received by a corresponding UE. If upper layer signaling indicates a specific subframe for measurement of RSRQ, RSSI is measured for all OFDM symbols included in the indicated subframe. RSRQ is a value measured in form of N*RSRP/RSSI, where N is the number of RBs of a corresponding bandwidth.

RLM is performed for the purpose for UE to determine 'in-sync' or 'out-of-sync' by monitoring DL link quality of a serving cell of its own. In this case, RLM is based on CRS. DL link quality estimated by UE is compared with 'in-sync threshold (Qin)' and 'out-of-sync threshold (Qout)'. These thresholds can be represented as PDCCH BLER (block error rate) of a serving cell. Particularly, Qout and Qin corresponding to 10% BLER and 2% BLER, respectively. Since Qin and Qout correspond to SINR of received CRS, if CRS received SINR is equal to or greater than a predetermined level (Qin), UE determines to be attached to a corresponding cell. If received SINR is smaller than a predetermined level (Qout), UE declares RLF (radio link failure).

As observed from the above-described definitions of RSRP and the like, measurement report is basically assumed as performed using CRS. Yet, in case that cells share the same PCID, since it is unable to distinguish cells having the same PCID from CRS, it is unable to perform RRM on each cell with measurement report including RSRP/RSRQ based on CRS only. Hence, if cells have the same PCID, additional RSRP/RSRQ measurement report can be performed based on individually transmitted CSI-RS. In order to raise reception accuracy in receiving CSI-RS of a specific cell, as neighbor cells do not perform signal transmission on corresponding CSI-RS carried RE, more accurate measurement can be performed despite that transmission frequency of CSI-RS is lower than that of CRS. Hence, although cells have different PCIDs, it is able to improve accuracy of RRM of network by performing CRS based RSRP/RSRQ measurement report and CSI-RS RSRP/RSRQ measurement report together.

Another main purpose of transmission of CSI-RS in each cell is to perform CSI feedback performed by UE in order to help scheduling of base station for determining rank, precoding matrix, MCS (modulation and coding scheme, or CQI) and the like, which will be used for DL data transmission between a corresponding cell and UE. In CoMP transmission scheme, UE should feed back CSI for DL with a cooperative cell as well as a serving cell. Since overhead is too large to feed back CSI for all cells in CoMP cluster to which a serving cell of UE belongs, it may be set to feed back CSI for some cells in CoMP cluster valuable for cooperative scheduling and cooperative data transmission, i.e., CoMP measurement set'. Determination of CoMP measurement set for specific UE can be configured by selecting cells having RSRP equal to or greater than a predetermined level. To this end, UE performs RSRP measurement report for cells in CoMP cluster to which the UE belongs. Alternatively, a base station informs UE of configurations of CSI-RSs, on which the UE will perform RSRP or RSRQ measurement, by designating them as CoMP management set. Thereafter, the UE performs RSRP or RSRQ measurement on CSI-RSs transmitted from cells belonging to the designated CoMP management set. If a corresponding result meets a specific condition, the UE can perform the report.

Together with this, in order to enable ICIC between CoMP clusters, in order a network and UE to obtain whether a prescribed one of cells of adjacent CoMP cluster causes strong interference to the corresponding UE and whether the corresponding UE causes strong UL interference to a prescribed cell, the UE performs RSRP measurement and report on cells in the adjacent CoMP cluster.

Together with the CRS based RSRP/RSRQ measurement report for mobility management of handover and the like of UE, by performing CSI-RS based RSRP/RSRQ measurement report for CoMP measurement set configuration and ICIC, it is able to improve accuracy and flexibility of RRM of network.

Measurement/Measurement Report of D2D UE

D2D UE can perform D2D signal transmission/reception (e.g., discovery signal transceiving, communication signal transceiving, etc.) in resource region indicated by base station/cluster node/D2D UE. D2D UE may perform D2D signal transmission/reception by selecting a resource from resources (e.g., D2D resource pool, etc.) for D2D transceiving indicated by base station/cluster header/D2D UE. In the latter case, D2D performance reduction may occur due to resource collision if the base station or the like fails to correctly obtain the demand for D2D communication in a cell (or, if the number of UEs participating in D2D communication rapidly changes). Moreover, if the base station or the like excessively allocates resources/resource pool required for D2D or a resource pool defined previously is too large, it may result in the waste of resources.

According to an embodiment of the present invention for solving the above problems, D2D UE can perform measurement on allocated resources/resource pool for D2D transceiving or a predefined resource pool. D2D UE can report a performed measurement result to a base station. Based on this result, the base station or the like can additionally allocate/update the resources/resource pool for D2D transceiving. Based on the measurement result, D2D UE can actively adjust D2D transmission periodicity, transmit power, threshold for determining whether to transmit, hopping pattern and the like. In this case, the D2D UE to which the embodiment of the present invention is applied may include D2D UE out-of-coverage as well as D2D UE in cellular coverage. The concept of the base station includes base station/cluster header/D2D UE capable of managing D2D resources. Discovery signal may be configured with a message in which a previously informed sequence and codeword of channel-coding information bits (e.g., information on UE transmitting and/or receiving discovery signal can be included in the discovery signal) are mapped to each other.

In order to reduce the load put on UE that performs measurement on D2D resource, measurement of UE can be performed in 2 levels/steps. For instance, referring to FIG. 6, a UE receives allocation of resources/resource pool (where the resources may mean an entire resource pool allocated for D2D operation by a base station) for D2D transceiving [S601], and is able to perform a first measurement on the resources/resource pool region for the D2D transceiving [S602]. Based on a result from performing a first measurement, the UE determines a resource region estimated as having a discovery signal exist therein [S603], and is then able to perform a second measurement on the estimated resource region [S604].

Figure 7:
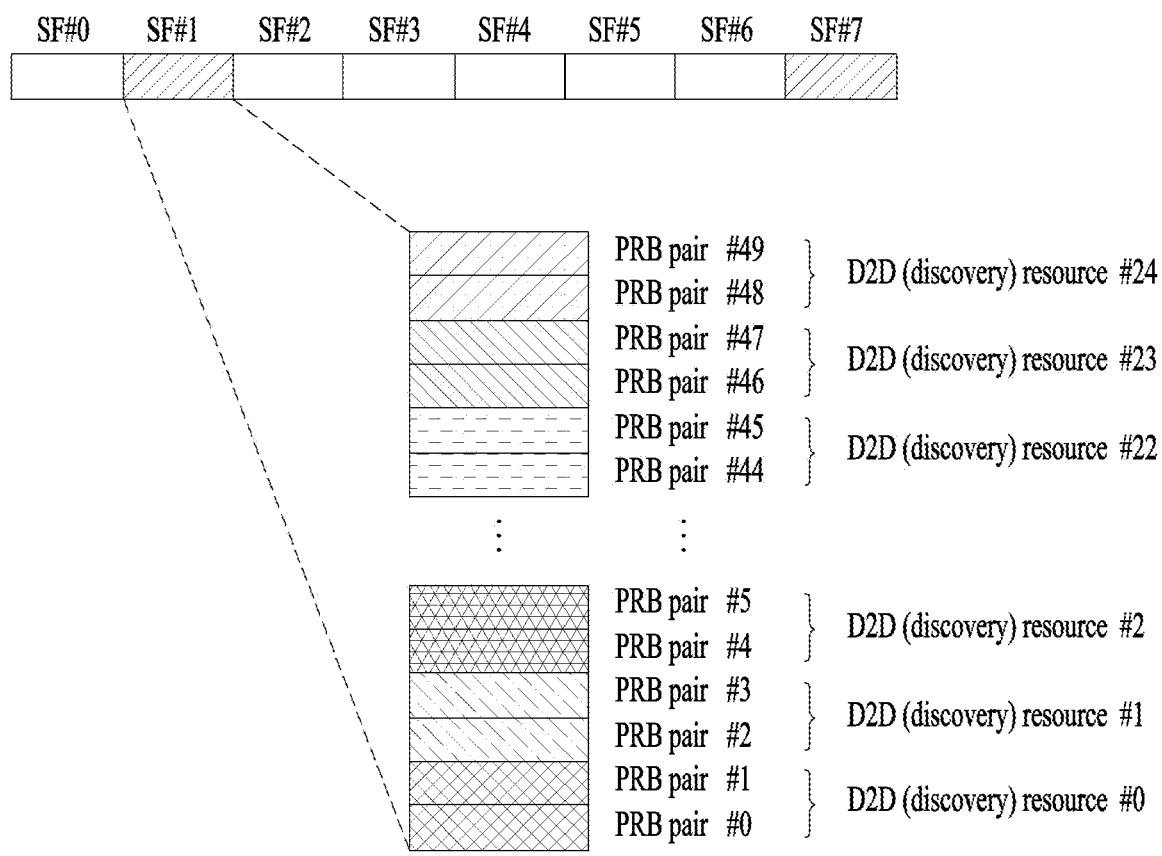
FIG. 7 is a diagram for one example of D2D resource region usable for an embodiment of the present invention.

FIG. 7 shows one example of resources/resource pool region for D2D transceiving, which can be allocated to a D2D UE. In FIG. 7, system bandwidth of 10 MHz (50 RBs) is assumed, subframe indexes #1 and #7 are assumed as allocated for D2D in time domain, and entire frequency resources are assumed as used for D2D in the corresponding time domain. The resource allocation can be signaled by a base station. Through the resource region, D2D discovery signal can be transmitted, and each discovery signal can be transmitted using 2 PRB pairs. In particular, in FIG. 7, 25 D2D resources for discovery are available per subframe. Although this example shows that 1 D2D resource group exists in 1 subframe only, different D2D resource groups may exist in the same time resource. For instance, D2D resource group 0 may be configured with D2D resources #0 to #10, and D2D resource group 1 may be configured with D2D resources #11 to #24. The resources/resource pool for the D2D transceiving in FIG. 7 are exemplarily provided to help the understanding, and the scope of the present is non-limited by FIG. 7.

The resource region on which the first and/or second measurement is performed, i.e., the resource region on which the measurement of the D2D UE is performed can be delivered to each D2D UE by the base station using upper layer signaling or the like, and time domain resource (OFDM symbol, subframe, subframe set unit or combination), frequency domain resource (PRB pair, PRB set unit or combination) and the like can be included to indicate the measurement performed region. This includes a case that the base station signals the resource range used for D2D to the UE and a case that a resource unit for performing measurement actually is defined in advance. For instance, the base station informs the UE of a resource region, on which D2D discovery can be performed, using subframe set and/or frequency domain and the like. If 1 discovery signal is transmitted on 2 PRB pairs, the UE can perform measurement of 20 PRB pair unit in the signaled time/frequency domain.

Figure 6:
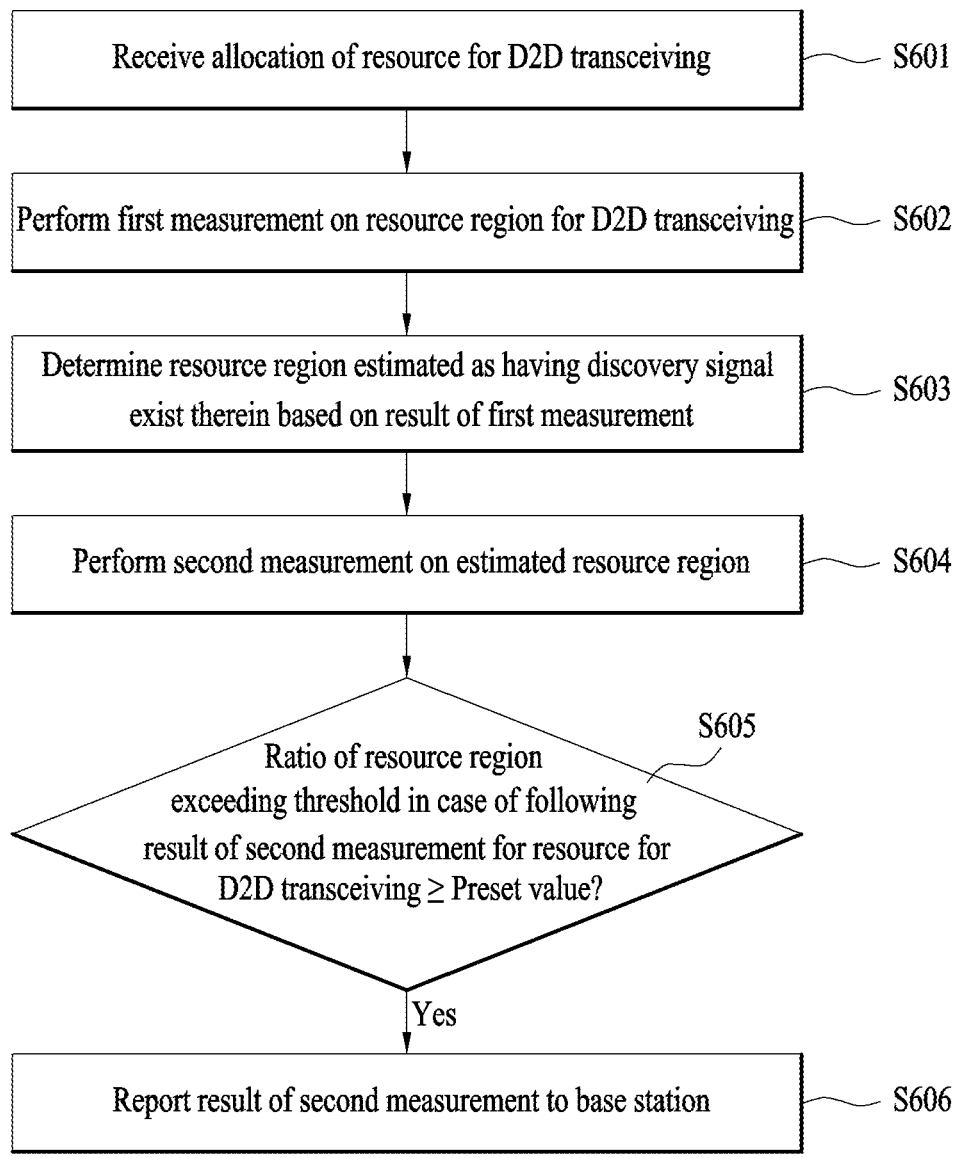
FIG. 6 is a flowchart to describe a measuring method according to an embodiment of the present invention.

After performing the second measurement, a measurement result can be reported to the base station. Referring now to FIG. 6, the measurement report may include a conditional/event triggering based report. In particular, if a rate of the resource region exceeding the threshold is equal to or greater than a preset value in case of following the second measurement result for the resources/resource pool for the D2D transceiving [S605], the measurement result can be reported to the base station [S606]. Alternatively, for instance, if D2D resources, of which D2D RSRQ is equal to or greater than X dB, (in D2D resources for currently performing D2D or entire D2D resources) are equal to or greater than Y %, the corresponding measurement result can be previously defined to be reported. Alternatively, conditions for X and Y may be signaled by the base station (through upper layer signaling or the like) or values of X and Y may be defined in advance.

Alternatively, the measurement result may be reported to the base station periodically or a periodically (including a case indicated by DCI). In case of the periodic report, periodicity may be defined in advance or delivered through upper layer signaling. In case of the a periodic report, a report timing point may be indicated through DCI masked with specific RNTI (e.g., D2D RNTI).

Having received the measurement result, the base station can reallocate/update the resources/resource pool for the D2D transceiving. For instance, for the resources/resource pool for the D2D transceiving, if a rate of a resource region exceeding a threshold is equal to or greater than a preset value in case of following the second measurement result, the resources/resource pool for the D2D transceiving can be additionally allocated (time unit such as subframe, etc., frequency unit such as PRB pair, etc., or time/frequency unit). So to speak, for the resources/resource pool for the D2D transceiving, if a rate of a resource region exceeding a threshold is equal to or greater than a preset value in case of following the second measurement result, the UE can receive additional allocation of resources/resource pool for the D2D transceiving from the base station. On the contrary, it is able to raise resource utilization by reducing the resources/resource pool for the D2D transceiving.

Thus, as the measurement result is reported to the base station, it can be used for the adjustment of the resources/resource pool for the D2D transceiving. Yet, the measurement result may be utilized by the UE. Namely, the UE can reduce feedback and/or signaling overhead using the measurement result. In particular, based on the first measurement result and/or the second measurement result, the UE can adjust transmission periodicity (or, transmission probability, transmit power, threshold for determining whether to transmit, hopping pattern for D2D signal, etc.). In this case, the threshold for determining whether to transmit may mean a threshold (e.g., D2D RSSI, D2D RSRQ, D2D BLER, D2D detection ratio, etc.) for determining whether to report measurement, which will be described later. Detailed examples are described as follows. First of all, each D2D UE measures BLER for D2D resource. If BLER exceeds X % (e.g., 10% BLER), D2D UE can increase D2D discovery transmission periodicity. (Transmission periodicity changed according to necessity may be reported to the base station. Candidate of changeable periodicity may be defined in advance or signaled by the base station.) For instance, when default transmission periodicity of D2D discovery signal is 2 ms, if measured D2D BLER exceeds 10%, transmission periodicity of 4 ms can be used. Moreover, transmission periodicity can be changed through thresholds of various steps. For instance, if D2D BLER is 10~20%, D2D discovery signal transmission can be stopped for 4 ms. If D2D BLER is 20~30%, D2D discovery signal transmission can be stopped for 8 ms. If D2D BLER exceeds 30%, D2D discovery signal transmission can be stopped until D2D BLER is reduced below 10%. For another instance, each D2D UE measures D2D detection ratio, which will be described later, for entire D2D resources. If a ratio of the detected resources to entire D2D resources is equal to or greater than a predetermined ratio, the corresponding UE can adjust D2D transmission periodicity, transmit power, threshold for determining whether to transmit, hoping pattern and the like. If average of D2D RSSI (or D2D RSRQ) is higher than a predetermined level or D2D resources having D2D RSSI (or D2D RSRQ) equal to or higher than predetermined level correspond to a ratio equal to or greater than a predetermined ratio over entire D2D resources, the corresponding UE can increase transmission periodicity of D2D signal (i.e., discovery or communication) and the like.

In the following, details of the measurement targets and/or method mentioned in the foregoing description shall be described. Regarding the aforementioned embodiment of the present invention, a) an embodiment relating to the detection ratio can be used for the first measurement, and b) RSSI, c) RSRQ (RSRP) and d) BLER can be used for the second embodiment. Yet, each measuring method described in the following may be used as an independent D2D measurement method.

D2D Measurement Target/Method a) Detection Ratio

UE can detect a presence or non-presence of discovery/communication signal from resources/resource pool for D2D transceiving through energy detection, sequence detection, CRC check and the like. Energy detection means an action of measuring energy per D2D resource. If energy over predetermined level is measured, UE can determine that corresponding D2D resource is used for discovery. As a sequence (e.g., DMRS scrambling sequence) detectable (by a sequence detecting method such as correlation or the like) may exist in a discovery signal, sequence detection means to detect such a sequence. If a targeted sequence is detected by performing sequence detection per D2D resource, UE can determine that the corresponding D2D resource is used for discovery. If information is loaded in a discovery signal together, UE performs (blind) decoding on each D2D resource and is able to determine that the successfully decoded D2D resource is used for discovery. In this case, the decoding success may mean that CRC check using CRC included in a discovery message is passed.

The UE can report the ratio of the detected D2D resource over the entire region, on which detection is attempted by the above method, to the base station. Namely, it is able to report that a prescribed amount of the resources/resource pool allocated for the D2D transceiving by the base station is actually used for D2D operation. The report of the detected D2D resource may be performed in a manner of reporting D2D resource index. Alternatively, if D2D signal (e.g., discovery or communication signal) is detected from 80% of the entire resources or more, the UE can transmit a warning signal for D2D resource to the base station or the cluster head UE. Additionally, details of the number (or ratio) and location (e.g., D2D resource index) of the detected D2D resources and the like can be reported.

b) RSSI

RSSI in D2D can be defined as a value resulting from converting total received signal strength per discovery resource or total received signal strength of each discovery resource into signal strength per unit resource (e.g., OFDM symbol unit, RE unit, PRB pair (set) unit, etc.). This has difference from the conventional RSSI in aspects of signal strength per D2D unit resource and measurement on specific frequency region only.

In particular, each D2D UE can report D2D RSSI using one or combination of the following methods. UE can report D2D RSSI for all known D2D resources (through signaling of the base station or defined in advance). In order to reduce report overhead, UE measures D2D RSSI for each discovery resource (all D2D resources or discovery signal detected D2D resource) and is then able to report the D2D resource, from which D2D RSSI higher than a specific threshold (signaled by the base station or defined in advance) is measured [e.g., ratio over entire D2D resources and/or a corresponding D2D resource index], to the base station. In doing so, D2D RSSI value measured on the corresponding discovery resource can be reported as well. Alternatively, D2D RSSIs measured on D2D resources in the corresponding D2D resource group can be averaged and reported. It is also able to consider a case that the average of the detected D2D resources proposed in the above and the average of RSSIs equal to or greater than a specific value among the detected D2D resources are reported. In this case, in order to reduce influence of a discovery signal transmitted from an adjacent D2D UE (i.e., in order to prevent RSSI from being determined by a signal transmitted from an adjacent D2D UE), RSSI corresponding to upper/lower X % can be excluded for the average from the measured RSSIs.

C) RSRP, RSRQ

Reference signal received power RSRP of D2D reference signal RS used in D2D discovery or communication is measured and then combined with the D2D RSSI, whereby RSRQ is derived and reported. Like D2D RSSI, D2D RSRQ differs from the conventional RSRQ in total received signal strength per D2D resource and RSRP. (The following contents may be applicable for RSRP only.)

D2D RSRQ may be defined as a ratio of RSSI (in doing so, RSSI may use a value normalized by a corresponding D2D resource unit) of the corresponding D2D resource pool (e.g., D2D resources, one of a multitude of groups resulting from dividing the entire D2D) to D2D RSRP in the corresponding D2D resource/unit resource.

UE can report D2D RSRQ for all D2D resources known (through signaling of base station or by being defined in advance). Regarding the report of all resources, since overhead may be relatively large, D2D RSRQ for D2D resource from which D2D signal is detected as a result of the first measurement can be measured and reported only.

As another method of reducing report overhead, UE measures D2D RSRQ for each discovery resource (all D2D resources or discovery signal detected D2D resource) and is then able to report D2D resource (e.g., a ratio over entire D2D resources and/or a corresponding D2D resource index), from which D2D RSRQ higher than a specific threshold (signaled by a base station or defined in advance) is measured, to the base station. In doing so, D2D RSRQ value measured from the corresponding discovery resource may be reported as well.

Like RSSI, an average of D2D RSRQ measured from all D2D resources, an average of D2D RSRQ measured from the detected D2D resource, an average of D2D RSRQ exceeding a predetermined threshold and the like may be considered in addition. In this case, in order to reduce influence of a discovery signal transmitted from an adjacent D2D UE, RSRQ corresponding to upper/lower X % can be excluded for the average from the measured RSRQs.

D) BLER (or, FER, SINR)

D2D BLER may mean a block error rate for a multitude of D2D frequency resources belonging to one or a multitude of D2D time resources unlike the conventional BLER (i.e., measurement of a presence or non-presence of error for a transport block transmitted to a corresponding UE by a base station). For instance, when it is determined that D2D is performed on 50 D2D resources among 100 D2D resources existing in one subframe, if decoding of 25 D2D resources among the 50 D2D resources is successful, 50% of BLER can be reported to the base station. Alternatively, in the above case, 100 D2D resources are regarded as samples of D2D BLER and it is able to report 25% of BLER. And, it may be able to report the number of samples (D2D resources) to which measurement is attempted additionally.

In order to measure D2D BLER, each D2D UE performs blind decoding without an advanced work on each D2D resource and is then able to measure BLER. Alternatively, each D2D UE obtains whether D2D signal exists (e.g., through the first measurement), performs decoding on D2D resource having high probability in being used for D2D, and is then able to measure BLER.

In doing so, in order to raise accuracy of measurement, BLERs measured on a multitude of time resources can be averaged and reported. Alternatively, it is able to calculate BLER for a multitude of time units on a presence or non-presence of block error for the same D2D resource in frequency domain. In this case, BLER of each D2D resource can be derived within a predetermined time region, and UE can report D2D resource information (e.g., D2D resource index) having BLER over a predetermined level and/or the corresponding BLER.

In case that each D2D UE reports BLER, it may be able to report details on BLER measurement to provide additional information to the base station. For instance, D2D UE can report some of combination of D2D BLER, the number of D2D performed D2D resources estimated by the corresponding UE (e.g., the number of D2D resources estimated as having D2D signal exist, derived by the method a)), and D2D BLER measured D2D resource information (e.g., D2D resource index).

The periodic or a periodic report of D2D BLER proposed in the above can be performed. And, an event triggering scheme, which is to make report if BLER is equal to or greater than a predetermined level, may be used. For another example of the vent triggering scheme, by the method a) or the like, if D2D signal detected resources are equal to or greater than a predetermined level over entire D2D resources, D2D BLER for the corresponding D2D resources can be reported.

The above-described D21D BLER may be substituted with specific BLER estimated SINR in consideration of decoding performance per UE. For instance, if a lowest SINR for 1% BLER of specific UE is 0 dB, the above proposal can be replaced by a ratio of D2D resource having SINR equal to or greater than 0 dB among entire D2D resources (or detected D2D resources).

As mentioned in the foregoing description, in case of measuring/reporting BLER, it is able to prevent a case that uncertain result is reported due to measurement performed on resource on which D2D discovery or communication is not actually performed. For instance, if noise is strongly introduced from a resource on which D2D is not performed, D2D UE determines that D2D is performed in the corresponding resource and may make inappropriate report. By measuring/reporting BLER, it is able to solve such a problem.

Meanwhile, as a method of raising utilization of D2D resource (by reducing overhead on measurement repot), it may be able to consider a method for a base station to count the number of users per D2D region. For instance, the base station partitions entire system bandwidth or entire D2D resources into a multitude of resource groups and is then able to inform each D2D UE of it through upper layer signaling or the like. Subsequently, each D2D UE determines a resource for transmitting a discovery signal and is then able to inform the base station of the determined resource. The base station estimates the number of UEs per group (e.g., discovery signal density) from each UE transmitting a discovery signal based on a resource group index for transmitting the discovery signal. If the discovery signals are concentrated on a specific group or UEs transmitting discovery signals exist over a predetermined level overall, the base station recommends a D2D resource group having low density of discovery signals to a specific UE or may allocate an additional D2D resource group to the specific UE.

The above-described method may increase accuracy of its own through a combination with the aforementioned measurement report. For instance, D2D UE transmitting a discovery signal informs a base station (or a cluster header UE) that the D2D UE transmits a discovery signal on a specific D2D resource group. Subsequently, the base station receives report of a D2D resource group, from which signal strength over a predetermined level is measured, or a D2D resource group, from which BLER over a predetermined level is measured, from a discovery signal detected D2D UE and then recommends another D2D resource group to UEs transmitting discovery signals in the corresponding resource group or allocate a new D2D resource group to the UEs.

Device Configuration According to Embodiment of Present Invention

Figure 8:
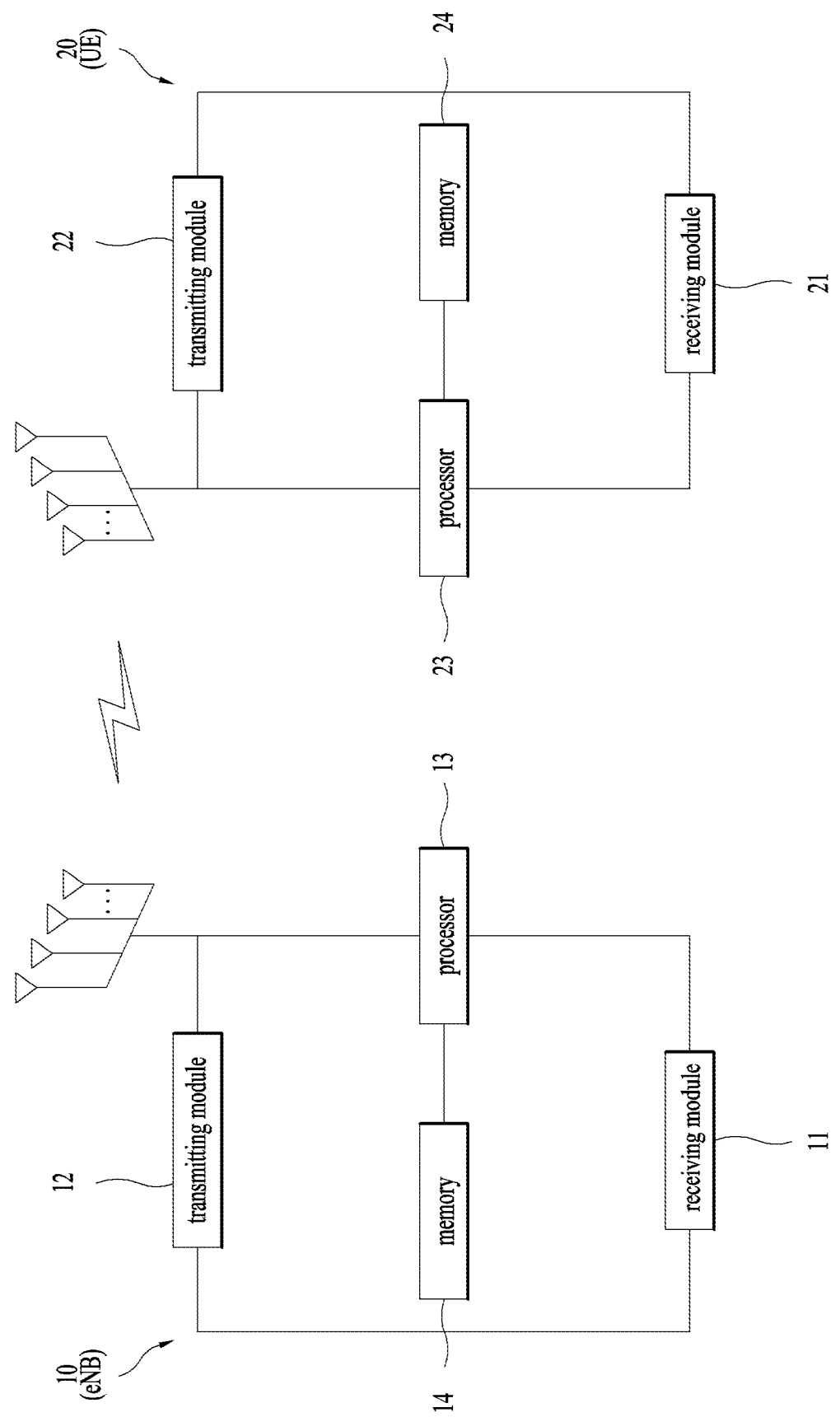
FIG. 8 is a diagram for configuration of a transceiving device.

FIG. 8 is a diagram for configurations of a transmitting point device and a user equipment device according to the present invention.

Referring to FIG. 8, a transmitting point device 10 according to the present invention may include a receiving module 11, a transmitting module 12, a processor 13, a memory 14 and a plurality of antennas 15. A plurality of the antennas 15 may mean a transmitting point device supportive of MIMO transmission and reception. The receiving module 11 can receive various signals, data and information in uplink from a user equipment. The transmitting module 12 can transmit various signals, data and information in downlink to the user equipment. And, the processor 13 can control overall operations of the transmitting point device 10.

The processor 13 of the transmitting point device 10 according to one embodiment of the present invention can process or handle the items required for the respective embodiments mentioned in the foregoing description.

The processor 13 of the transmitting point device 10 performs functions of operating and processing information received by the transmitting point device 10, information to be transmitted by the transmitting point device 10, and the like. The memory 14 can store the operated and processed information and the like for a prescribed period and can be substituted with such a component as a buffer (not shown in the drawing) and the like.

Referring still to FIG. 8, a user equipment device 20 according to the present invention may include a receiving module 21, a transmitting module 22, a processor 23, a memory 24 and a plurality of antennas 25. A plurality of the antennas 25 may mean a user equipment device supportive of MIMO transmission and reception. The receiving module 21 can receive various signals, data and information in downlink from a transmitting point. The transmitting module 22 can transmit various signals, data and information in uplink to the transmitting point. And, the processor 23 can control overall operations of the user equipment device 20.

The processor 23 of the user equipment device 20 according to one embodiment of the present invention can process or handle the items required for the respective embodiments mentioned in the foregoing description.

The processor 23 of the user equipment device 20 performs functions of operating and processing information received by the user equipment device 20, information to be transmitted by the user equipment device 20, and the like. The memory 24 can store the operated and processed information and the like for a prescribed period and can be substituted with such a component as a buffer (not shown in the drawing) and the like.

In the above-mentioned detailed configurations of the transmitting point device and the user equipment device, the contents or items explained in the descriptions of the various embodiments of the present invention may be independently applicable or at least two embodiments of the present invention may be simultaneously applicable. And, redundant descriptions shall be omitted from the following description for clarity.

The description of the transmitting point device 10 with reference to FIG. 8 may be identically applicable to a relay node device as a DL transmitting entity or a UL receiving entity. And, the description of the user equipment device 20 with reference to FIG. 8 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description are applicable to various kinds of mobile communication systems.

What is claimed is:

1. A method for performing a device-to-device (D2D) communication by a user equipment (UE) in a wireless communication system, the method comprising:
   receiving allocation of a resource region for the D2D communication;
   performing a first measurement on the resource region for the D2D communication;
   determining whether the resource region has a discovery signal based on a result of the first measurement;
   performing a second measurement on the resource region when the result of the first measurement indicates the resource region has the discovery signal; and
   adjusting discovery signal transmission periodicity of the UE based on a result of the second measurement,
   wherein, based on the result of the second measurement being smaller than 10% block error rate (BLER), the discovery signal transmission periodicity of the UE is set to 2 ms,
   wherein, based on the result of the second measurement being in a range of 10% to 20% BLER, the discovery signal transmission periodicity of the UE is set to 4 ms,
   wherein, based on the result of the second measurement being in a range of 20% to 30% BLER, the discovery signal transmission periodicity of the UE is set to 8 ms, and
   wherein, based on the result of the second measurement exceeding 30% BLER, a discovery signal transmission is stopped and the first measurement is performed again until the result of the second measurement is reduced below 10% BLER.

2. The method of claim 1, wherein the first measurement is performed in a manner of detecting energy from the resource region for the D2D communication.

3. The method of claim 1, wherein when adjusting the discovery signal transmission periodicity, the UE reports information on the adjustment of the discovery signal transmission periodicity to a base station.

4. The method of claim 1, wherein when a ratio of the resource region having the discovery signal is determined to exceed a threshold by an amount equal to or greater than a preset value based on the result of the second measurement, the UE receives allocation of an additional resource region for the D2D communication from a base station.

5. The method of claim 1, wherein when a ratio of the resource region having the discovery signal is determined to exceed a threshold by an amount equal to or greater than a preset value based on the result of the second measurement, the UE reports the result of the second measurement to a base station for the resource region for the D2D communication.

6. The method of claim 1, wherein the first measurement is performed by detecting a sequence for the discovery signal.

7. The method of claim 1, wherein the first measurement is performed by detecting cyclic redundancy check (CRC) for the discovery signal.

8. A user equipment (UE) for performing a device-to-device (D2D) communication in a wireless communication system, the UE comprising:
   a receiver; and
   a processor configured to:
   receive, via the receiver, allocation of a resource region for the D2D communication,
   perform a first measurement on the resource region for the D2D communication,
   determine whether the resource region has a discovery signal based on a result of the first measurement,
   perform a second measurement on the resource region when the result of the first measurement indicates the resource region has the discovery signal, and
   adjust discovery signal transmission periodicity of the UE based on a result of the second measurement,
   wherein, based on the result of the second measurement being smaller than 10% block error rate (BLER), the discovery signal transmission periodicity of the UE is set to 2 ms,
   wherein, based on the result of the second measurement being in a range of 10% to 20% BLER, the discovery signal transmission periodicity of the UE is set to 4 ms,
   wherein, based on the result of the second measurement being in a range of 20% to 30% BLER, the discovery signal transmission periodicity of the UE is set to 8 ms, and
   wherein, based on the result of the second measurement exceeding 30% BLER, a discovery signal transmission is stopped and the first measurement is performed again until the result of the second measurement is reduced below 10% BLER.

9. The UE of claim 8, wherein the first measurement is performed in a manner of detecting energy from the resource region for the D2D communication.

10. The UE of claim 8, wherein when adjusting the discovery signal transmission periodicity, the UE reports information on the adjustment of the discovery signal transmission periodicity to a base station.

11. The UE of claim 8, wherein when a ratio of the resource region having the discovery signal is determined to exceed a threshold by an amount equal to or greater than a preset value based on the result of the second measurement, the UE receives allocation of an additional resource region for the D2D communication from a base station.

12. The UE of claim 8, wherein when a ratio of the resource region having the discovery signal is determined to exceed a threshold by an amount equal to or greater than a preset value based on the result of the second measurement, the UE reports the result of the second measurement to a base station for the resource region for the D2D communication.

13. The UE of claim 8, wherein the first measurement is performed by detecting a sequence for the discovery signal.

14. The UE of claim 8, wherein the first measurement is performed by detecting cyclic redundancy check (CRC) for the discovery signal.

* * * * *